US011580860B2

(12) United States Patent
Ripert et al.

(10) Patent No.: US 11,580,860 B2
(45) Date of Patent: Feb. 14, 2023

(54) OPTIMIZING TASK ASSIGNMENTS IN A DELIVERY SYSTEM

(71) Applicant: Maplebear, Inc., San Francisco, CA (US)

(72) Inventors: Mathieu Ripert, San Francisco, CA (US); Jagannath Putrevu, San Francisco, CA (US); Deepak Tirumalasetty, Castro Valley, CA (US); Bala Subramanian, Fremont, CA (US); Andrew Kane, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 222 days.

(21) Appl. No.: 17/018,096

(22) Filed: Sep. 11, 2020

(65) Prior Publication Data

US 2020/0410864 A1 Dec. 31, 2020

Related U.S. Application Data

(62) Division of application No. 15/787,286, filed on Oct. 18, 2017, now Pat. No. 10,818,186.

(51) Int. Cl.
*G08G 1/00* (2006.01)
*G06Q 10/0833* (2023.01)
(Continued)

(52) U.S. Cl.
CPC ............ *G08G 1/20* (2013.01); *B65G 1/0492* (2013.01); *B65G 1/1373* (2013.01); *G01C 21/34* (2013.01);
(Continued)

(58) Field of Classification Search
USPC .................... 705/26.81, 7.26, 7.11
See application file for complete search history.

(56) References Cited

U.S. PATENT DOCUMENTS 7,096,189 B1   8/2006  Srinivasan
7,212,976 B2 *  5/2007  Scheer ............... G06Q 10/0875
                                                          705/28

(Continued)

OTHER PUBLICATIONS

Frey, James, et al. "Condor-G: A computation management agent for multi-institutional grids." Cluster Computing 5.3 (2002): 237-246. (Year: 2002).*

(Continued)

*Primary Examiner* — Gurkanwaljit Singh
(74) *Attorney, Agent, or Firm* — Fenwick & West LLp

(57) ABSTRACT

An online shopping concierge system identifies a set of delivery orders and a set of delivery agents associated with a location. The system allocates the orders among the agents, each agent being allocated at least one order. The system obtains agent progress data describing travel progress of the agents to the location, and order preparation progress data describing progress of preparing the orders for delivery. The system periodically updates the allocation of the orders among the agents based on the agent progress data and the order preparation progress data. This involves re-allocating at least one order to a different delivery agent. When a first agent arrives at the location, the system assigns to the first agent the orders allocated to the first agent. The system then removes the first agent from the set of available delivery agents, and removes the assigned delivery orders from the set of delivery orders.

20 Claims, 6 Drawing Sheets

(51) Int. Cl.
  *G06Q 30/0601* (2023.01)
  *G06Q 10/0631* (2023.01)
  *G05D 1/02* (2020.01)
  *G06Q 20/32* (2012.01)
  *G01C 21/34* (2006.01)
  *G06Q 10/087* (2023.01)
  *B65G 1/137* (2006.01)
  *B65G 1/04* (2006.01)

(52) U.S. Cl.
  CPC ... *G05D 1/0217* (2013.01); *G06Q 10/063116* (2013.01); *G06Q 10/087* (2013.01); *G06Q 10/0833* (2013.01); *G06Q 20/322* (2013.01); *G06Q 30/0635* (2013.01); *G05D 1/0291* (2013.01)

(56) References Cited

U.S. PATENT DOCUMENTS

| | | | |
|---|---|---|---|
| 7,295,990 | B1 | 11/2007 | Braumoeller et al. |
| 7,725,366 | B1 | 5/2010 | Franco |
| 7,747,543 | B1 | 6/2010 | Braumoeller et al. |
| 7,751,928 | B1 * | 7/2010 | Antony ............... G06Q 10/087 700/214 |
| 7,774,243 | B1 * | 8/2010 | Antony ............... G06Q 10/087 53/445 |
| 8,117,086 | B1 | 2/2012 | Utz et al. |
| 8,620,707 | B1 | 12/2013 | Belyi et al. |
| 9,120,622 | B1 | 9/2015 | Elazary et al. |
| 9,466,045 | B1 | 10/2016 | Kumar |
| 2002/0133387 | A1 | 9/2002 | Wilson et al. |
| 2002/0138358 | A1 * | 9/2002 | Scheer ............... G06Q 30/06 705/29 |
| 2002/0143669 | A1 * | 10/2002 | Scheer ............... G06Q 20/203 705/28 |
| 2003/0171962 | A1 | 9/2003 | Hirth et al. |
| 2004/0054592 | A1 | 3/2004 | Hernblad |
| 2004/0210621 | A1 * | 10/2004 | Antonellis ............ G06Q 10/087 709/200 |
| 2007/0040026 | A1 * | 2/2007 | Vleet ................... G06Q 20/20 235/383 |
| 2010/0089997 | A1 | 4/2010 | Carson et al. |
| 2011/0040655 | A1 | 2/2011 | Hendrickson |
| 2011/0173034 | A1 | 7/2011 | Riepshoff et al. |
| 2012/0156337 | A1 | 6/2012 | Studor et al. |
| 2014/0075004 | A1 | 3/2014 | Van Dusen et al. |
| 2015/0039450 | A1 | 2/2015 | Hernblad |
| 2015/0207278 | A1 | 7/2015 | Nakamura |
| 2015/0307278 | A1 | 10/2015 | Wickham et al. |
| 2016/0117627 | A1 * | 4/2016 | Raj .................. G06Q 10/06398 705/7.42 |
| 2016/0304281 | A1 | 10/2016 | Elazary et al. |
| 2017/0178070 | A1 | 6/2017 | Wang et al. |
| 2017/0193425 | A1 * | 7/2017 | Roman ................. H04L 51/224 |

OTHER PUBLICATIONS

Shehory, Onn, and Sarit Kraus. "Methods for task allocation via agent coalition formation." Artificial intelligence 101.1-2 (1998): 165-200. (Year: 1998).*

Cooper, Robin, and Robert S. Kaplan. "Activity-based systems: Measuring the costs of resource usage." Accounting horizons 6.3 (1992): 1-13 (Year: 1992).*

Ropke, Stefan, and David Pisinger. "An adaptive large neighborhood search heuristic for the pickup and delivery problem with time windows." Transportation science 40.4 (2006): 455-472. (Year: 2006).*

Lam, C. Y., & Ip, W. H. (2011). Constraint priority scheduling using an agent-based approach. Industrial Managements. Data Systems, 111(2), 246-263. (Year: 2011).*

United States Office Action, U.S. Appl. No. 15/787,286, filed Mar. 6, 2020, 15 pages.

Mexican Institute of Industrial Property, Office Action, MX Patent Application No. MX/a/2018/012713, dated Dec. 3, 2020, 11 pages.

* cited by examiner

OPTIMIZING TASK ASSIGNMENTS IN A DELIVERY SYSTEM

CROSS REFERENCE TO RELATED APPLICATIONS

This application is a division of co-pending U.S. application Ser. No. 15/787,286, filed Oct. 18, 2017, which is incorporated by reference in its entirety.

BACKGROUND

This invention relates generally to optimizing the assignment of tasks to agents in a delivery system. Some embodiments relate to allocation and re-allocation of delivery tasks to delivery agents, and other embodiments relate to allocation of orders among warehouses, picking agents, and delivery agents in a delivery system.

In current delivery systems, shoppers fulfill orders at a physical retailer on behalf of customers, as part of an online shopping concierge service. The online shopping concierge system assigns to shoppers various tasks involved in completing the orders, such as driving to a particular store, collecting one or more items at the store, purchasing the items, and delivering the items to a customer. In some cases, the online shopping concierge service assigns different tasks to different shoppers. For example, the online shopping concierge service can assign one shopper to collect and purchase the items, and assign a second shopper to drive to the store to pick up and deliver the purchased items. Thus, a single order is handed off from the in-store shopper to the delivery driver. Because of variations in the amount of time that it will take the in-store shopper to collect and purchase the items and variations in the amount of time that it will take the delivery driver to get to the store, the assignments of deliveries to the drivers determined by the online shopping concierge service may become sub-optimal before a delivery driver arrives at the store. For example, if the driver arrives early, or if the in-store shopper takes more time than expected preparing an order assigned to the driver, the driver may have to wait at the store until the orders are ready. Because of the large amount of data received by the service, and the large number of decisions to be made (including choosing stores, shoppers, and drivers for many orders), it is challenging to react to new data in real time and optimize the full delivery system.

SUMMARY

Online shopping concierge systems that assign a first shopper to collect items and a second shopper to deliver the items encounter two main sources of uncertainty: the amount of time that it takes the first shopper to collect items, and the amount of time that it takes the second shopper (referred to herein as the "delivery agent") to get to the store. A single store may have multiple shoppers collecting items for different orders simultaneously, and there may be multiple delivery agents traveling to the store. In a simple example, if a first delivery agent arrives at the store before an order assigned to that delivery agent is ready for pick-up, but a different order prepared at the same store but assigned to a second delivery agent is ready for pick-up ahead of schedule, it may be preferable for the first delivery agent to take the prepared order and for the second delivery driver, still traveling to the store, to take the order originally assigned to the first delivery agent, rather than have the first delivery agent wait for his assigned order. Thus, if an online shopping system assigns orders to drivers in an "optimal" way before the orders are prepared and before the drivers travel to their respective stores, these assignments may no longer be optimal by the time drivers arrive at stores.

However, in a system with many orders and delivery agents, optimizing the assignment of many delivery tasks across many delivery agents based on data describing the tasks, data describing the agents, and real-time data describing the progress of the shoppers and delivery agents is computationally intensive and time-consuming. If the online shopping concierge system determined an optimal assignment for a particular delivery agent after he arrived at the store, there would be a lag between the agent's arrival and the assignment. Moreover, it is not computationally efficient to perform a time-consuming, system-wide optimization in response to a single action—a delivery agent arriving at a store. Thus, to provide current optimal delivery assignments quickly and more efficiently, embodiments disclosed herein continually or periodically perform optimal re-allocation of the orders based on real-time data.

For example, the online shopping concierge system can re-allocate the orders between the drivers based on information describing the progress of the order preparation and the progress of the delivery agents. In particular, the online shopping concierge system can make initial allocations of orders to delivery agents assigned to pick up orders at the store, but as updated information is received, the online shopping concierge system periodically re-allocates the orders among the delivery agents. After a delivery agent arrives at the store, the online shopping concierge system locks in that delivery agent to one or more orders based on the most recent allocation, and the online shopping concierge system continually re-allocates the remaining orders among the remaining delivery agents.

More particularly, in some embodiments, the online shopping concierge system identifies a plurality of delivery orders associated with a location and plurality of delivery agents associated with the location. The plurality of delivery orders are prepared at the location for delivery. The online shopping concierge system allocates the plurality of delivery orders among the plurality of delivery agents, each delivery agent being allocated at least one delivery order. The online shopping concierge system obtains delivery agent progress data describing travel progress of the delivery agents to the location and order preparation progress data describing progress of preparing the delivery orders for delivery. The online shopping concierge system periodically updates the allocation of the plurality of delivery orders among the plurality of delivery agents based on the delivery agent progress data and the order preparation progress data. The allocation updating involves re-allocating at least one delivery order of the plurality of delivery orders to a different delivery agent of the plurality of deliver agents. In response to a first delivery agent arriving at the location, the online shopping concierge system assigns to the first delivery agent the delivery orders allocated to the first delivery agent. In response to assigning to the first delivery agent the delivery orders allocated to the first delivery agent, the online shopping concierge system removes the first delivery agent from the plurality of delivery agents, and removes the delivery orders assigned to the first delivery agent from the plurality of delivery orders.

Other aspects relate to the allocation of orders between stores, in-store shoppers, and delivery agents. Each order received at the online shopping concierge system includes a number of constraints, including the items to be delivered, a delivery location, and a delivery time window. For each order received, the online shopping concierge system makes several decisions, including determining a store or other warehouse to process the order, assigning a shopper to collect the items at the determined warehouse, and assigning a delivery agent to deliver the order from the warehouse to the customer. If the online shopping concierge system receives multiple orders, the online shopping concierge system can also make decisions to group multiple orders to a single store, group multiple orders to a single in-store shopper, and group multiple orders to a single delivery agent. As orders are processed, the online shopping concierge system also receives real-time information describing the progress of order preparation and delivery, and may continually receive new orders to process. The large amount of data received and the number of decisions to be made across multiple orders make it computationally difficult to optimize the full set of task assignments, and make it difficult to re-allocate the assignments when new information or new orders are received. Accordingly, the systems and methods described herein break up the optimization problem into multiple optimizations that assign orders one level at a time, by first assigning orders to locations, then assigning in-store shoppers to orders, and then assigning delivery agents to orders.

In particular, in some embodiments, the online shopping concierge system identifies a plurality of delivery orders and a plurality of warehouse locations. Each delivery order has an associated delivery window and a delivery location. The online shopping concierge system allocates each of the plurality of delivery orders to one of the plurality of warehouse locations based on the delivery location for each of the plurality of delivery orders. For each warehouse location, the online shopping concierge system first allocates each delivery order of the delivery orders allocated to the warehouse location to a picking agent of a plurality of picking agents located at the warehouse location. Each delivery order is allocated to a picking agent based on a latest time of completion for preparing the delivery order. The online shopping concierge system then generates a set of optimal delivery combinations for the delivery orders allocated to the warehouse location, and allocates each optimal delivery combination in the set of optimal delivery combinations to a delivery agent of a plurality of delivery agents associated with the warehouse location.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment of a Shopping Assistance Platform

Figure 1:
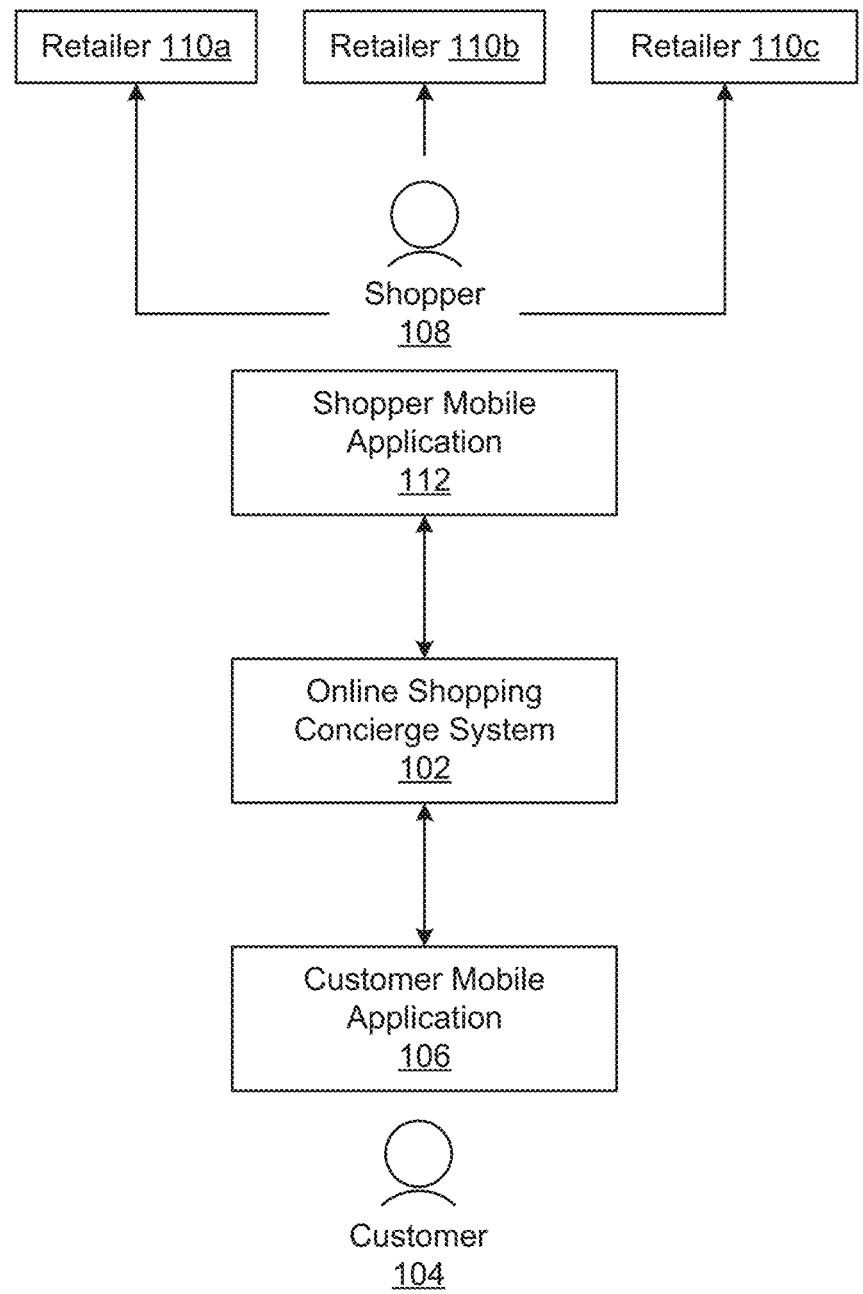
FIG. 1 illustrates and environment of an online shopping concierge service, according to one embodiment.

FIG. 1 illustrates the environment 100 of a shopping assistance platform, according to one embodiment. The environment 100 includes an online shopping concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the shopping assistance platform 102.

The system 102 is configured to transmit orders received from customers 104 to one or more shoppers 108. A shopper 108 may be a contractor, employee, or other person (or entity) who is enabled to fulfill orders received by the online shopping concierge system 102. The environment 100 also includes three retailers 110a, 110b, and 110c (only three are shown for the sake of simplicity; the environment could include hundreds of retailers). Each shopper 108 fulfills an order received from the online shopping concierge system 102 at one or more retailers 110, delivers the order to the customer 104, or performs both fulfillment and delivery. In one embodiment, shoppers 108 make use of a shopper mobile application 112 which is configured to interact with the online shopping concierge system 102.

Online Shopping Concierge System

Figure 2:
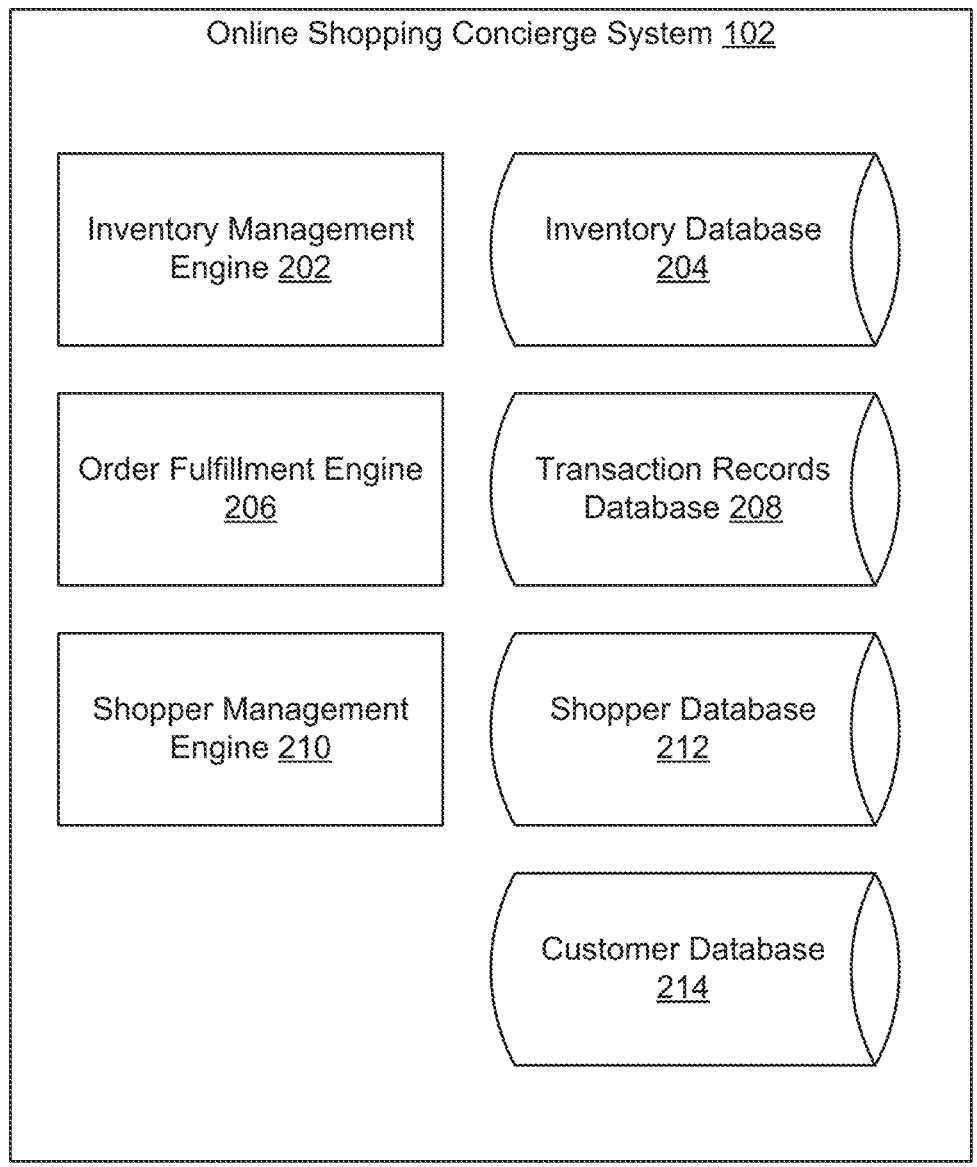
FIG. 2 is a diagram of an online shopping concierge system, according to one embodiment.

FIG. 2 is a diagram of an online shopping concierge system, according to one embodiment. The online shopping concierge system 102 includes an inventory management engine 202, which interacts with inventory systems associated with each retailer 110. In one embodiment, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204.

The online shopping concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which retailers 110. The order fulfillment engine 206 determines a sale price for each item ordered by a customer 104. Prices set by the order fulfillment engine 206 may or may not be identical to in-store prices determined by retailers 110 (which is the price that customers 104 and shoppers 108 would pay at the retailer 110). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailers 110. For example, after successful fulfillment of an order, the order fulfillment engine 206 may transmit a summary of the order to the appropriate retailer. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate retailer to fulfill the order based on one or more parameters, such as the contents of the order, the inventory of the retailers, and the proximity to the delivery location. The shopper management engine 210 then identifies one or more appropriate shoppers 108 to fulfill the order based on one or more parameters, such as the shopper's proximity to the appropriate retailer 110 (and/or to the customer 104), his/her familiarity level with that particular retailer 110, and so on. Additionally, the shopper management engine 210 accesses a shopper database 212 which stores information describing each shopper 108, such as his/her name, gender, rating, previous shopping history, and so on. In some embodiments, the shopper management engine 210 identifies an in-store shopper to prepare an order and a separate delivery driver to deliver the order. Methods for allocating and re-allocating orders between retailers 110 and shoppers 108 is described in detail with respect to FIGS. 4-7.

Finally, as part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

Figure 3A:
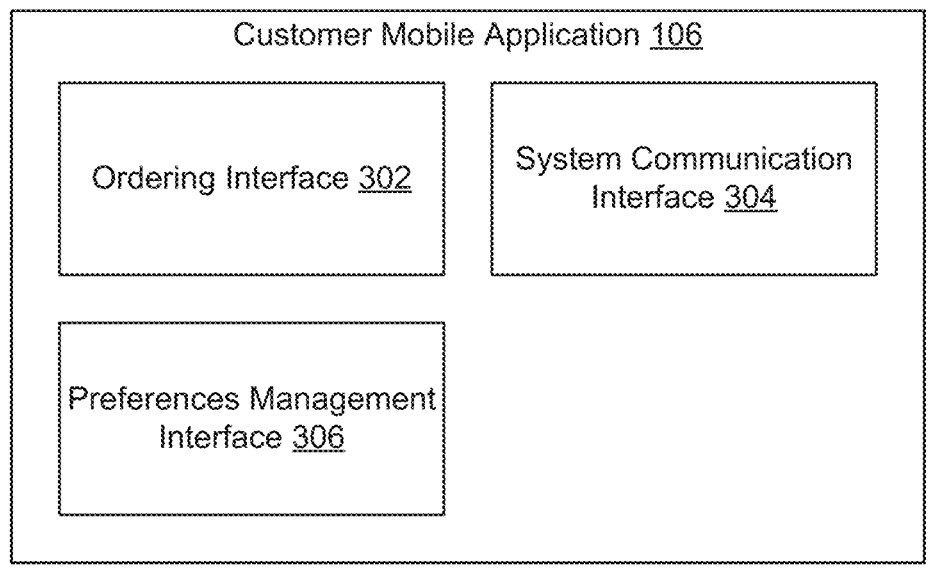
FIG. 3A is a diagram of a customer mobile application (CMA) 106, according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the user to manage other details such as his/her favorite or preferred retailers 110, preferred delivery times, special instructions for delivery, and so on.

Figure 3B:
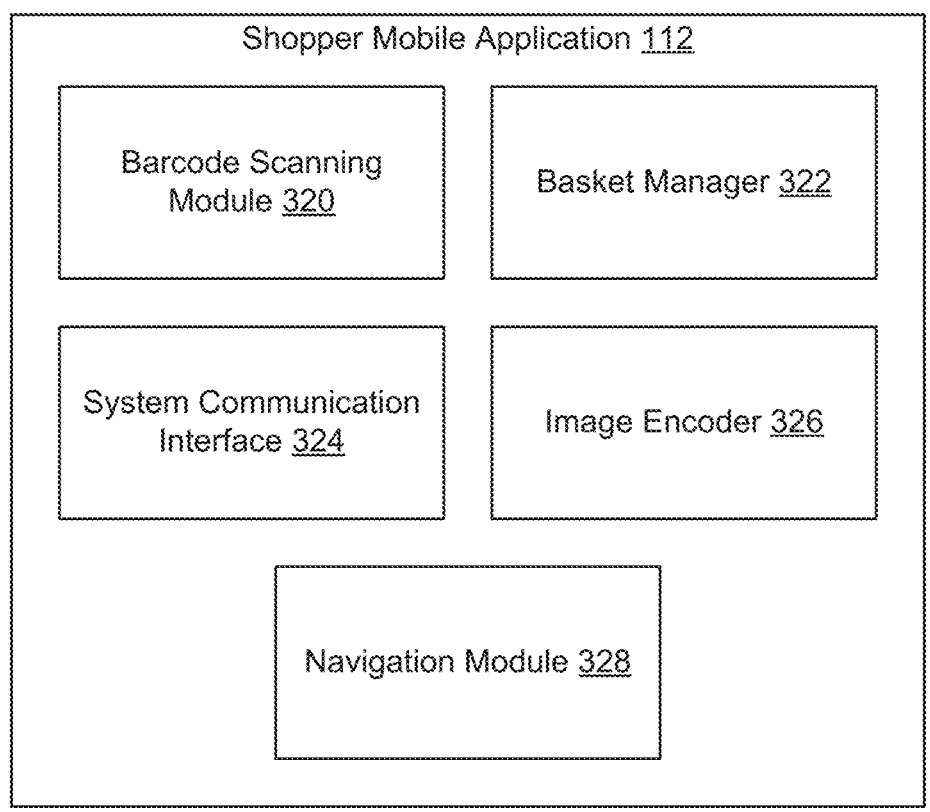
FIG. 3B is a diagram of a shopper mobile application (SMA) 112, according to one embodiment.

FIG. 3B is a diagram of the shopper mobile application (SMA) 112, according to one embodiment. The SMA 112 includes a barcode scanning module 320 which allows a shopper 108 to scan an item at a retailer 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a retailer 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the retailer 110 at check-out. In some embodiments, the SMA 112 also includes a navigation module 328 that provides direction to a retailer 110 and to customer delivery locations. The navigation module 328 may receive or detect the current location of the user operating the SMA 112. In some embodiments, the SMA 112 may not have a navigation module 328, and instead interacts with a separate navigation application available on the same device as the SMA 112.

Allocating Orders Among Warehouses and Shoppers

Figure 4:
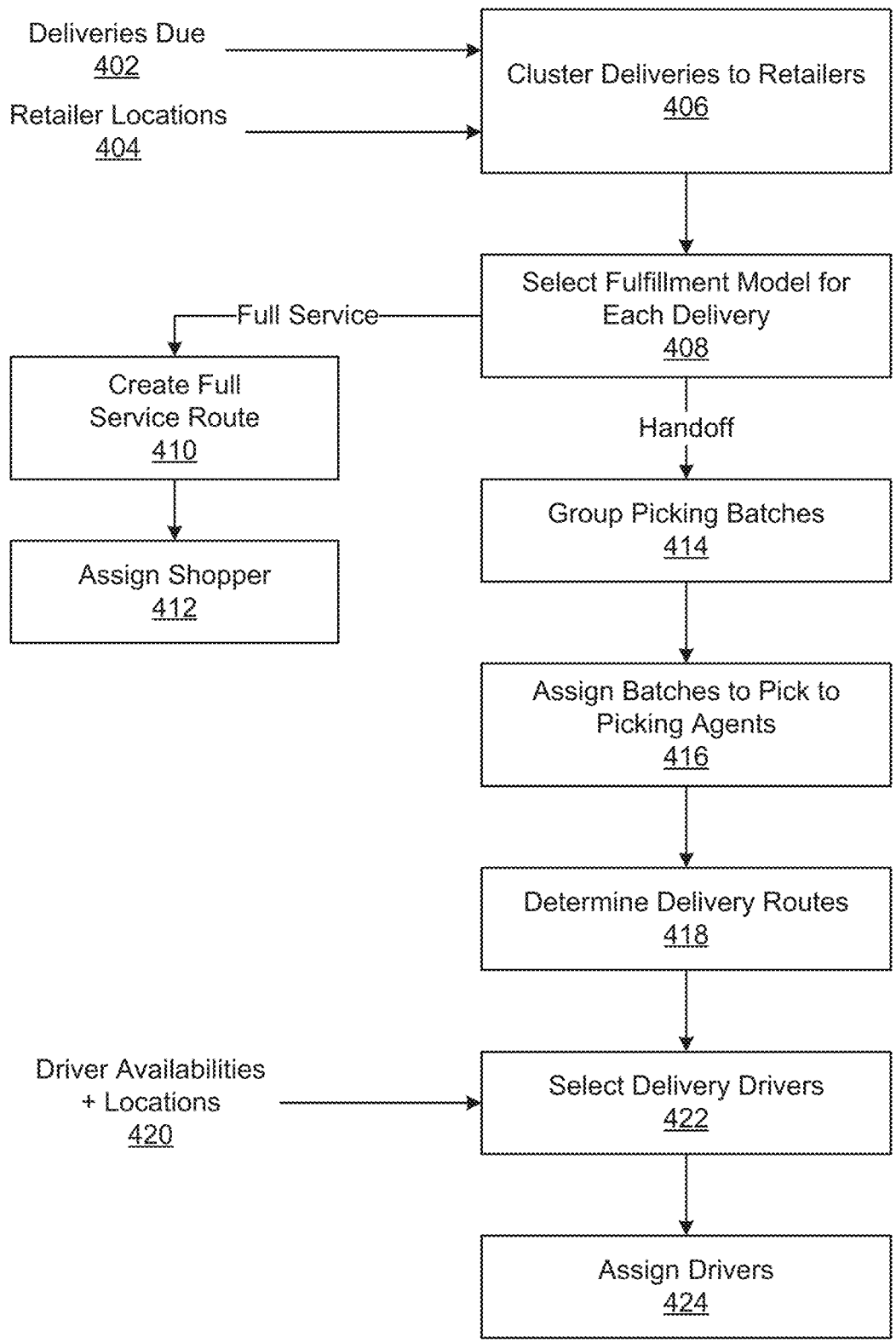
FIG. 4 is a flowchart illustrating a process of allocating delivery orders among stores, in-store shoppers, and delivery agents, according to one embodiment.

As described with reference to FIG. 2, the shopper management engine 210 of the online shopping concierge system 102 can allocate orders between retailers 110 and assign orders to shoppers 108 to pick the orders and deliver the orders. FIG. 4 illustrates the process of allocating delivery orders between stores, in-store shoppers, and delivery agents, according to one embodiment. The online concierge shopping system 102 receives data 402 describing a set of delivery orders that are due, and data 404 describing a set of retailer locations. The deliveries due 402 may include all delivery orders that have been received at the system 102 from customers 104, or all delivery orders due within a particular time frame, e.g., the current day, the next day, or during a particular time window. The retailer locations 404 may include information from the inventory database 204 describing, e.g., the inventory and location of the retailers 110. Based on this information, the shopper management engine 210 clusters 406 the deliveries 402 to the retailer locations 404. For example, the shopper management engine 210 may identify feasible pairs of delivery order and retailers (e.g., for a delivery order, identify a retailer with a suitable inventory and within a threshold distance of the delivery address), and group these pairs together in a favorable or optimal way. In some embodiments, a single delivery order can be split into multiple orders, e.g., if the items cannot be fulfilled at a single retailer. An exemplary process for clustering deliveries is described in greater detail with respect to FIG. 6.

The shopper management engine 210 then selects 408 a fulfillment model for each delivery. In this process 400, the online shopping concierge system 102 chooses between two models—a full service model and a handoff model—for each order. In the full service model, a single shopper 108 both collects the items for the order and delivers the items to the customer 104. In the handoff model, a first shopper 108 collects the items for the order, and a second shopper 108 delivers the items to the customer 104. The first shopper is referred to as an "in-store shopper" or a "picking agent," and the second shopper is referred to as a "delivery driver" or a "delivery agent." A picking agent is a contractor, employee, or other person located at a retailer 110 or any other facility in which items to be delivered are stored (generally referred to herein as a "warehouse"). In some embodiments, the picking may be partially or fully automated, e.g., using a robot that can travel around a warehouse and collect items for delivery. A delivery agent is a contractor, employee, or other person who travels between the warehouse and the delivery location (e.g., the customer's home or office). A delivery agent may travel by car, truck, bicycle, scooter, foot, or other mode of transportation. In some embodiments, the delivery may be partially or fully automated, e.g., using a self-driving car.

The shopper management engine 210 selects 408 the fulfillment model based on the results of the clustering 406. For example, if the clustering 406 has assigned a large number of orders to a single retailer 110, it may be more efficient to have use the handoff model for orders at that retailer. If the clustering 406 has assigned a small number of orders to a retailer 110, it may be more efficient to use the full service model for orders at that retailer. System constraints may also be used to select 408 the fulfillment model. For example, certain shoppers 108 may only be able to perform either picking or delivery (e.g., a shopper 108 without a driver's license may not be eligible to deliver orders), or shoppers 108 may express a preference for full service fulfillment. In some other embodiments, either the full service model or the handoff model is used for all orders, and the shopper management engine 210 does not select 408 between two available models.

If the full service model is selected, the shopper management engine 210 creates 410 the full service route. The full service route describes the tasks assigned to the shopper 108, e.g., proceed to an assigned retailer 110, pick the items in the order, purchase the items, and deliver the items to an address. The shopper management engine 210 may also estimate the time to complete the full service route and notes any constraints on the route, e.g., age restrictions. After creating 410 the route, the shopper management engine 210 assigns 412 an appropriate shopper to the route. For example, the shopper management engine 210 may assign 412 shoppers 108 based the routes and on shopper eligibility. The shopper management engine 210 may assign multiple orders to a single shopper 108 for increased efficiency. For example, a shopper 108 may pick two or more orders at the retailer 110 simultaneously, and then deliver the picked orders to the customers 104. The route creation 410 and assignment 412 may optimize for one or more factors, such as minimizing the number of shoppers 108 needed to fulfill the orders and/or maximizing the amount of active time of the shoppers 108.

If the handoff model is selected, the shopper management engine 210 groups 414 the orders into picking batches, i.e., batches of orders to be picked by the in-store shoppers. The orders are grouped at the warehouse level—once the deliveries have been clustered 406 to a retailer or warehouse, the shopper management engine 210 considers each warehouse's deliveries separately, without accounting for deliveries assigned to other warehouses. This way, the shopper management engine 210 can process the batching for multiple warehouses in parallel. The orders assigned to one warehouse are grouped into batches based on the orders' latest times of completion and the expected time to for a picking agent to pick the orders. In some embodiments, the shopper management engine 210 determines a latest time at which the picking can be completed based on the delivery window and an estimated amount of time to travel to the delivery address from the warehouse. Batches of orders that can be picked in time for delivery are assigned 416 to a picking agent. The batching and assignment of orders to picking agents can also be optimized for one or more factors, such maximizing picking agent active time, minimizing the number of picking agents, or optimizing the time of completion for each order. An exemplary process for batching and assigning orders to picking agents is described in greater detail with respect to FIG. 7.

The shopper management engine 210 determines 418 delivery routes for the orders that have been assigned to picking agents at the warehouse. Each delivery route includes one or more orders assigned to the warehouse and specifies to where the orders should be delivered. The shopper management engine 210 may determine the delivery routes based on an estimated time of completion for preparing each delivery order, the delivery window of each delivery order, and the delivery location of each delivery order. The shopper management engine 210 may optimize for one or more factors, such maximizing delivery agent active time, minimizing the number of delivery agents, or optimizing the time of delivery for each order.

The shopper management engine 210 receives the availabilities and locations 420 of drivers. The drivers may have already been assigned to the warehouse through a separate process performed by the online shopping concierge system 102, or the shopper management engine 210 may assign particular drivers to warehouses during the allocation process 400. The availability data for a driver or other delivery agent may include, for example, the time at which the driver will be available (e.g., if the driver is not working yet), the carrying capacity (e.g., by number of bags or by weight), the transportation method (e.g., car, bike, foot), the types of deliveries suitable (e.g., based on age restrictions), or other factors relevant to assigning delivery agents to orders. The shopper management engine 210 can use the location data for a driver to determine an expected time for the driver to arrive at the warehouse location. The shopper management engine 210 uses the driver availability and location information 420 to select 422 delivery drivers for each determined delivery route. The delivery drivers are selected 422 according to the drivers' availability constraints, and may be selected to optimize for one or more factors, such as minimizing the number of delivery agents used or minimizing delivery agent wait time. The shopper management engine 210 assigns 424 the selected drivers to the orders for delivery. As described with respect to FIG. 5, the shopper management engine 210 may periodically recalculate the delivery routes and may delay assigning a particular driver to a delivery route until the driver has arrived at the warehouse location. An exemplary process for allocating and re-allocating delivery drivers to order is described in detail with respect to FIG. 5.

As discussed, the process 400 involves multiple sub-processes which can be independently optimized. For example, clustering deliveries to retailers 406, selecting a fulfillment model 408, creating a full service route 410 in the full service model, grouping picking batches 414, determining delivery routes 418, and selecting delivery drivers 422 can each optimize for one or more different objectives. Furthermore, many of these sub-processes build on prior decisions to reduce the size of the optimization problems. For example, the shopper management engine 210 selects 408 the fulfillment model after clustering 406 the orders, so that the fulfillment model for each warehouse can be considered independently. Similarly, the picking batches are grouped 414 on a per-warehouse basis. Because input into the process 400 changes frequently (e.g., when new orders are received, and when the speed or availability of the shoppers 108 changes), it is advantageous for the shopper management engine 210 to be able to re-allocate resources quickly. Dividing the task of assigning orders to locations and shoppers into multiple sub-processes, as shown in process 400, improves the speed at which overall system optimization can be performed and allows the shopper management engine 210 to quickly adapt to changes and new data.

The process 400 can be executed on a frequent basis, according to a set schedule or in response to a new set of inputs. For example, the process 400 can be executed every 30 seconds, every minute, every two minutes, every five minutes, or at some other regular interval. The process 400 may rely on input from additional outside processes that are executed less frequently. For example, each night, the online shopping concierge system 102 may run models to estimate driving times, picking times, delivery times, pickup times, and number of bags for all orders received for the next day. If the online shopping concierge system 102 is configured to accept same-day orders, then when such orders are received, these estimates can be calculated for the additional orders.

Allocating and Assigning Orders to Delivery Agents

As mentioned above, in some embodiments, the shopper management engine 210 assigns 424 each driver to a set of deliveries when the driver arrives at the warehouse location. Before a driver arrives, the shopper management engine 210 can re-allocate deliveries between drivers as other drivers arrive, orders are picked, and the shopper management engine 210 receives or calculates new estimates for driver arrival and order picking completion times. By waiting until a driver arrives to lock that driver into a set of deliveries, the shopper management engine 210 is able to assign each driver an optimal set of deliveries based on the most recent information.

Figure 5:
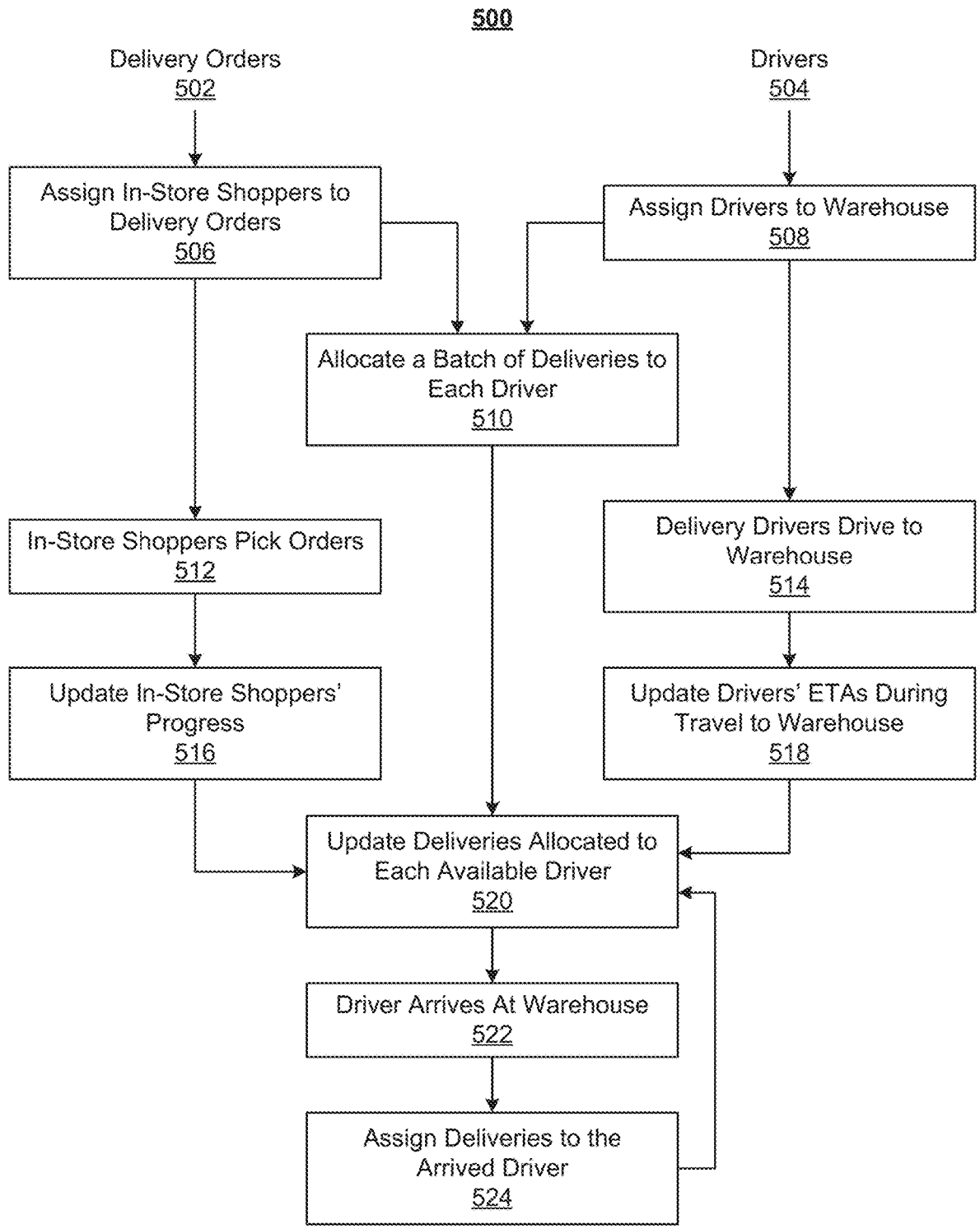
FIG. 5 is a flowchart illustrating a process of allocating deliveries to delivery drivers and re-allocating the deliveries based on updated information, according to one embodiment.

FIG. 5 is a flowchart illustrating a process 500 of allocating deliveries to delivery drivers and re-allocating the deliveries based on updated information, according to one embodiment. The process 500 allocates deliveries from one warehouse location; a similar process 500 may be executed in parallel for each warehouse location. The process 500 has two initial inputs: data describing delivery orders 502, and data describing drivers 504. The delivery orders 502 are similar to the deliveries due 402 described with respect to FIG. 4. The drivers 504 can be any delivery agents as described with respect to FIG. 4; while delivery agents may use other modes of transportation besides driving, for convenience, they are referred to as drivers in process 500. The process 500 for allocating deliveries may run periodically or continually, and as the process 500 executes, or in between executions of the process 500, the inputs 502 and 504 may change. For example, when the online shopping concierge system 102 receives new orders from customers 104, these are added to the data describing the delivery orders 502. In addition, the availability of individual drivers 504 or other delivery agents changes over time. Drivers 504 may have set hours, may indicate in advance the hours during which they will accept jobs, or may be able to set their availability in real time.

The shopper management engine 210 assigns 506 in-store shoppers to the delivery orders 502. The assignment 506 may be similar to the assignment 416 described with respect to FIG. 4, or the assignment process described below in relation to FIG. 7. Before assigning 506 the delivery orders 502 to the in-store shoppers, the shopper management engine 210 may cluster deliveries to retailers, select a fulfillment model, and group picking batches as described with respect to FIG. 4. In some embodiments, the shopper management engine 210 may not assign shoppers all of the orders at once, but instead, assigns one order to each shopper at a time. In some embodiments, the shopper management engine 210 can assign a single shopper to pick multiple orders simultaneously.

The shopper management engine 210 also assigns 508 drivers 504 to the warehouse. The shopper management engine 210 assigns drivers 504 based on the drivers' locations, the number of orders assigned to the warehouse, the delivery locations of the orders assigned to the warehouse, the delivery windows for the orders assigned to the warehouse, and other factors. Assigning the drivers to the warehouse may be incorporated into the process 400 described with respect to FIG. 4. The shopper management engine 210 may determine the assignment of drivers to warehouses to optimize for one or more factors, such as the activity level of the drivers, number of drivers, or the delivery schedule.

After the in-store shoppers are assigned 506 to the order and the drivers are assigned 508 to the warehouse, the shopper management engine 210 allocates 510 a batch of deliveries to each driver. The allocation 510 may be based on the destination location of each delivery order, and a delivery window of each delivery order. For example, the shopper management engine 210 may group together delivery orders based on their delivery locations, their delivery windows, and their expected completion times. The shopper management engine 210 then allocates a set of grouped delivery orders to a particular driver based on the time that the driver is expected to arrive at the warehouse.

As an example, a warehouse has 10 orders queued for picking and delivery, 3 drivers assigned to drive to the warehouse, and 3 in-store shoppers. Table 1, below, lists the 10 queued orders, the estimated time it will take a shopper to pick the items in each order, and the delivery window for each order. Table 1 also lists the shopper assigned 506 to each order, the time during which the shopper should pick the order, the orders allocated 510 to each driver, and the time at which the driver should delivery each order. The shopper assignments and driver allocations are determined by the shopper management engine 210, as described above. As described further below, the orders allocated to each driver may change, so the drivers are not yet assigned to orders.

TABLE 1

| Order # | Estimated Time to Pick Items | Delivery Window | Assigned Shopper + Picking Schedule | Driver + Delivery Schedule |
|---|---|---|---|---|
| 1 | 10 mins | 2:00-3:00 pm | Shopper 1 1:00-1:10 pm | Driver 1 2:00 pm |
| 2 | 30 mins | 2:00-3:00 pm | Shopper 2 1:00-1:30 pm | Driver 1 2:20 pm |
| 3 | 15 mins | 2:00-3:00 pm | Shopper 3 1:00-1:15 pm | Driver 2 2:30 pm |
| 4 | 10 mins | 2:00-3:00 pm | Shopper 3 1:15-1:25 pm | Driver 1 2:40 pm |
| 5 | 25 mins | 2:30-3:30 pm | Shopper 3 1:25-1:50 pm | Driver 2 2:50 pm |
| 6 | 30 mins | 2:30-3:30 pm | Shopper 1 1:10-1:40 pm | Driver 1 3:00 pm |
| 7 | 40 mins | 2:30-3:30 pm | Shopper 2 1:30-2:10 pm | Driver 2 3:10 pm |
| 8 | 40 mins | 2:30-3:30 pm | Shopper 3 1:50-2:30 pm | Driver 3 2:50 pm |
| 9 | 20 mins | 3:00-4:00 pm | Shopper 1 1:40-2:00 pm | Driver 3 3:10 pm |
| 10 | 20 mins | 3:00-4:00 pm | Shopper 1 2:00-2:20 pm | Driver 3 3:30 pm |

In this simplified example, each drop off location is assumed to be a 10 minute drive from the prior location (the warehouse for the first delivery, and the prior delivery location for subsequent deliveries), and 10 minutes are allotted for other steps involved in the delivery, such as parking, contacting the customer, walking to the customer's door, and handing the items off to the customer. According to the above table, a batch of four deliveries are allocated to Driver 1: Order 1, Order 2, Order 4, and Order 6. Orders 1, 2, and 4 can be delivered between 2:00 pm and 3:00 pm; Order 6 can be delivered between 2:30 pm and 3:30 pm. According to the picking schedule, this batch of orders should be picked by their assigned shoppers by 1:40 pm, so Driver 1 should arrive at the warehouse at 1:40 pm. A batch of three deliveries is allocated to Driver 2: Order 3, Order 5, and Order 7. According to the picking schedule, this batch of orders should be picked by their assigned shoppers by 2:10 pm. Another batch of three deliveries is allocated to Driver 2: Orders 8, 9, and 10. According to the picking schedule, this batch of orders should be picked by their assigned shoppers by 2:30 pm.

As shown in Table 1, the shopper management engine 210 allocated the delivery orders to drivers based on the delivery window of each delivery order. While for simplicity the destination location of the delivery orders is not shown in Table 1, the shopper management engine 210 can also allocate delivery orders among the drivers based on the delivery location of each delivery order. For example, the shopper management engine 210 may group together orders that are located near each other and that can all be delivered within their respective delivery windows. By batching together nearby deliveries, the shopper management engine 210 can increase the number of deliveries that can be delivered by a single driver over a given time period. In some embodiments, the shopper management engine 210 determines an optimal set of delivery orders for each driver based on one or more factors. For example, the optimal set may be based on one or more of data describing the drivers' progress, data describing the in-store shoppers' progress, the destination locations of the delivery orders, and the delivery windows of the delivery orders.

In one embodiment, the shopper management engine 210 allocates some delivery orders before others. For example, the shopper management engine 210 may greedily batch orders for certain deliverers, such as walking, biking, or scootering deliverers, who only deliver orders to addresses that are relatively close to the warehouse. In some embodiments, the shopper management engine 210 uses a partition solver to find an optimal combination set of the remaining orders. The optimal combinations can be allocated to available drivers to find an optimal combination-driver set.

In an embodiment, the shopper management engine 210 allocates orders based on the capacity of the driver. The shopper management engine 210 may predict, based on the items in the order and historical data, the number of bags that will be used to hold the items in each order. In some embodiments, the shopper management engine 210 can predict the numbers of different types of bags, e.g., freezer bags, refrigerator bags, pantry bags, etc., that will be used to hold the items in each order. The shopper management engine 210 may additionally or alternatively estimate a weight of each order, which would be relevant for bicycle or walking deliverers. The shopper management engine 210 then compares the size of the orders (estimated by number of bags, weight, or some other capacity estimate) to the capacity of the driver to determine whether the driver can take an order, or a batch of orders. The shopper management engine 210 can determine the capacity of a deliverer based on the mode of transportation (e.g., bicycle, walker, scooter, car, SUV, truck, etc.), and in some cases, by vehicle data (e.g., make and model of car).

Returning to FIG. 5, the in-store shoppers pick 512 the orders assigned to them. At the same time, the delivery drivers drive 514 to the warehouse. During the process 500, the shopper management engine 210 updates 516 the in-store shoppers' progress based on data received from the shoppers, e.g., via the shopper mobile application 112. The in-store shoppers' progress may include, or be used to determine, an estimated time at which the shoppers' will complete the picking of each order. The shopper management engine 210 can determined the picking time estimates based on, e.g., the number or percentage of items that the shopper has already picked, the types of items remaining to be picked, information about any delay in the check-out lines, or other factors.

The shopper management engine 210 also updates 518 the drivers' estimated times of arrival (ETAs) during their travel to the warehouse, e.g., based on a location received from the shopper mobile application 112. The shopper management engine 210 may also receive information describing traffic patterns, such as real-time traffic data, to determine the drivers' ETAs. Based on the updates to the in-store shoppers' progress 516 and the drivers' ETAs 518, the shopper management engine 210 updates 520 which deliveries are allocated to each available driver to balance the deliveries between drivers. As discussed above, the allocation of the deliveries to the drivers can optimize for one or more factors, such as reducing driver downtime, and maximizing the number of deliveries made during their delivery windows.

As an example, at 1:30 pm, the shopper management engine 210 has received updated information about Shopper 1, who is assigned to pick Orders 1, 6, and 10, and Driver 1, to whom Orders 1, 2, 4, and 6 were allocated. The updated information indicates that Shopper 1's first order for picking, Order 1, took 20 minutes to complete, and the second order for picking, Order 6, is now estimated to be picked by 1:50 pm, 10 minutes later than the prior estimate of 1:40 pm. The updated information also indicates that Driver 1 will arrive at the warehouse 1 minutes late, at 1:42 pm. The other shoppers and drivers are still on schedule.

According to this updated information, Order 6, which is allocated to Driver 1, will not be picked by the time Driver 1 arrives. Rather than having Driver 1 wait at the warehouse for 8 minutes while Order 6 is picked, the shopper management engine 210 updates the deliveries allocated to Driver 1, so that Order 6 is no longer allocated to Driver 1. The shopper management engine 210 instead allocates Order 6 to Driver 3. Table 2, below, shows the updates to the picking schedule, and the updated associations between the drivers and their allocated deliveries. Table 2 also shows updates to the delivery schedule. Previous schedule information that has been updated is shown in parentheses. Driver 1's delivery schedule is delayed by 2 minutes, due to Driver 1 arriving 2 minutes later than expected to the warehouse. Order 6 is transferred to Driver 3, and the delivery schedule for Driver 3 is adjusted accordingly.

TABLE 2

| Order # | Estimated or Actual Time to Pick Items | Delivery Window | Assigned Shopper + Picking Schedule | Associated Driver + Delivery Schedule |
|---|---|---|---|---|
| 1 | 20 mins (actual) (was 10 mins) | 2:00-3:00 pm | Shopper 1 1:00-1:20 pm (was 1:00-1:10 pm) | Driver 1 2:02 pm (was 2:00 pm) |
| 2 | 30 mins | 2:00-3:00 pm | Shopper 2 1:00-1:30 pm | Driver 1 2:22 pm (was 2:20 pm) |
| 3 | 15 mins | 2:00-3:00 pm | Shopper 3 1:00-1:15 pm | Driver 2 2:30 pm |
| 4 | 10 mins | 2:00-3:00 pm | Shopper 3 1:15-1:25 pm | Driver 1 2:42 pm (was 2:40 pm) |
| 5 | 25 mins | 2:30-3:30 pm | Shopper 3 1:25-1:50 pm | Driver 2 2:50 pm |
| 6 | 30 mins | 2:30-3:30 pm | Shopper 1 1:20-1:50 pm (was 1:10-1:40 pm) | Driver 3 2:50 pm (was Driver 1, 3:00 pm) |
| 7 | 40 mins | 2:30-3:30 pm | Shopper 2 1:30-2:10 pm | Driver 2 3:10 pm |
| 8 | 40 mins | 2:30-3:30 pm | Shopper 3 1:50-2:30 pm | Driver 3 3:10 pm (was 2:50 pm) |
| 9 | 20 mins | 3:00-4:00 pm | Shopper 1 1:50-2:10 pm (was 1:40-2:00 pm) | Driver 3 3:30 pm (was 3:10 pm) |
| 10 | 20 mins | 3:00-4:00 pm | Shopper 1 2:10-2:30 pm (was 2:00-2:20 pm) | Driver 3 3:50 pm (was 3:30 pm) |

In this example, the picking schedule for Shopper 1 was updated based on Shopper 1's delay in preparing Order 1, but the shopper assignments did not change. In other embodiments, the shopper management engine 210 may also modify the shopper assignments if needed to ensure that orders are picked on time.

As the process 500 progresses, a driver arrives 522 at the warehouse. At or near the time that the driver has arrived, the shopper management engine 210 assigns 524 a set of deliveries to the driver who has arrived. When the driver was first assigned 508 to the warehouse, the online shopping concierge system 102 may have only communicated an instruction to travel to the warehouse location via the shopper mobile application 112. When the driver arrives 522 at the warehouse and is assigned 524 a set of deliveries, the online shopping concierge system 102 communicates an instruction to deliver the assigned orders via the shopper mobile application 112. This instruction identifies the orders for pick-up, the address to which each order should be delivered, the delivery order and delivery times. In some embodiments, the shopper mobile application 112 provides these instructions piecewise, e.g., first instructing the driver to pick up a set of orders, then instructing the driver to drive to a first address and delivery one order, then instructing the driver to drive to a second address and deliver a second order, etc.

In some cases, the shopper management engine 210 assigns orders that have already been prepared (i.e., orders that have an estimated completion time of zero) so that the driver does not have to wait for orders to be prepared. In other cases, it may be more efficient to have the driver wait for one or more orders, so that the driver can deliver more orders in one batch. In the above example, Driver 1 is scheduled to arrive at 1:42 pm. When Driver 1 arrives at 1:42 pm, the shopper management engine 210 assigns the orders presently allocated to Driver 1 (Orders 1, 2, and 4 according to Table 2) to Driver 1, which have already been prepared by the in-store shoppers.

In this example, the deliveries allocated to each available driver were only updated 520 one time before a set of deliveries was assigned to Driver 1. However, it should be understood that the shopper management engine 210 can receive additional updates about the in-store shoppers' progress and the drivers' ETAs to the warehouse, and the shopper management engine 210 can update 520 the deliveries allocated to each available driver multiple times before a driver arrives at the warehouse. For example, the shopper management engine 210 may update 520 the allocation according to a schedule (e.g., every minute, every 2 minutes, every 5 minutes, etc.). As another example, the shopper management engine 210 may update 520 the allocation in response to receiving new updates 516 or 518, in response to receiving updates 516 or 518 that change a progress or ETAs by at least a threshold amount, or based on some other factor. Any repeated updating of the allocation, according to a set schedule, the receipt of updated data, or other factors, is referred to herein as periodically updating the allocation.

In addition, the shopper management engine 210 updates 520 the deliveries allocated to each available driver after deliveries are assigned 524 to an arrived driver by removing the deliveries that have been assigned to the arrived driver. Table 3 shows the removal of the Orders 1, 2, and 4, assigned to Driver 1 after Driver 1 arrived at the warehouse. The shopper management engine 210 may also update 520 the deliveries allocated to each available delivery after new delivery orders 502 and/or new drivers 504 are input to the queue. Table 3 also includes three new delivery orders 502—Orders 11, 12, and 13—that have been added to the queue, assigned 506 to in-store shoppers, and associated 510 with a driver.

TABLE 3

| Order # | Estimated or Actual Time to Pick Items | Delivery Window | Assigned Shopper + Picking Schedule | Associated Driver + Delivery Schedule |
|---|---|---|---|---|
| 3 | 15 mins | 2:00-3:00 pm | Shopper 3 1:00-1:15 pm | Driver 2 2:30 pm |
| 5 | 25 mins | 2:30-3:30 pm | Shopper 3 1:25-1:50 pm | Driver 2 2:50 pm |
| 6 | 30 mins | 2:30-3:30 pm | Shopper 1 1:20-1:50 pm | Driver 3 2:50 pm |
| 7 | 40 mins | 2:30-3:30 pm | Shopper 2 1:30-2:10 pm | Driver 2 3:10 pm |
| 8 | 40 mins | 2:30-3:30 pm | Shopper 3 | Driver 3 |

TABLE 3-continued

| Order # | Estimated or Actual Time to Pick Items | Delivery Window | Assigned Shopper + Picking Schedule | Associated Driver + Delivery Schedule |
|---|---|---|---|---|
| 9 | 20 mins | 3:00-4:00 pm | 1:50-2:30 pm Shopper 1 | 3:10 pm Driver 3 |
| 10 | 20 mins | 3:00-4:00 pm | 1:50-2:10 pm Shopper 1 | 3:30 pm Driver 3 |
| 11 | 10 mins | 3:30-4:30 pm | 2:10-2:30 pm Shopper 2 | 3:50 pm Driver 3 |
| 12 | 30 mins | 3:30-4:30 pm | 2:10-2:20 pm Shopper 1 | 4:10 pm Driver 1 |
| 13 | 25 mins | 3:30-4:30 pm | 2:30-2:50 pm Shopper 2 | 3:30 pm Driver 1 |
|  |  |  | 2:20-2:45 pm | 3:50 pm |

As shown in Table 3, the new Order 11 can be picked by Shopper 2 by 2:20, which is before the time that Driver 3 is scheduled to leave the warehouse. Driver 3 can deliver Order 11 at 4:10 pm, which is within the 3:30-4:30 delivery window for this order. Therefore, shopper management engine 210 has allocated 510 Order 11 to Driver 3. The shopper management engine 210 assigned 506 Orders 12 and 13 to Shoppers 1 and 2, respectively, and allocated 510 Orders 12 and 13 to Driver 1, who will be assigned 508 to return to the warehouse after delivering Orders 1, 2, and 4. The shopper management engine 210 could alternatively allocate delivery or one or more of the new orders (or one or more prior orders) to a new driver. Similarly, the shopper management engine 210 can allocate picking of one or more of the new orders (or one or more prior orders) to a new in-store shopper.

In one embodiment, the shopper management engine 210 can determine whether to send a new driver to the warehouse by assessing a time and cost for an additional driver to drive to the warehouse, and assessing how the additional driver would affect the delivery schedule. If the time and cost would sufficiently improve the delivery schedule (e.g., if a cost-benefit analysis indicates that the ability to deliver orders within their windows would justify the cost of the additional driver), the shopper management engine 210 instructs an additional driver to travel to the location. This additional driver is added to the set of available drivers 504 travelling to the warehouse, and the shopper management engine 210 allocates at least one of the delivery orders to the additional driver. In some embodiments, allocating the delivery order to the new driver triggers a re-allocation of the other orders to the other drivers, e.g., by re-allocating another delivery order to a different driver.

Any time the orders are allocated or re-allocated, the shopper management engine 210 may perform any of the optimizations or balancing performed during the initial allocation 510. For example, as described above, the shopper management engine 210 determines an optimal allocation based on one or more of data describing the drivers' progress, data describing the in-store shoppers' progress, the destination locations of the delivery orders, and the delivery windows of the delivery orders. During the re-allocation, the shopper management engine 210 may optimize for one or more factors, such as reducing driver downtime, reducing driver cost, and/or maximizing the number of deliveries that are made during their delivery windows.

Allocating Delivery Orders to Warehouses

Figure 6:
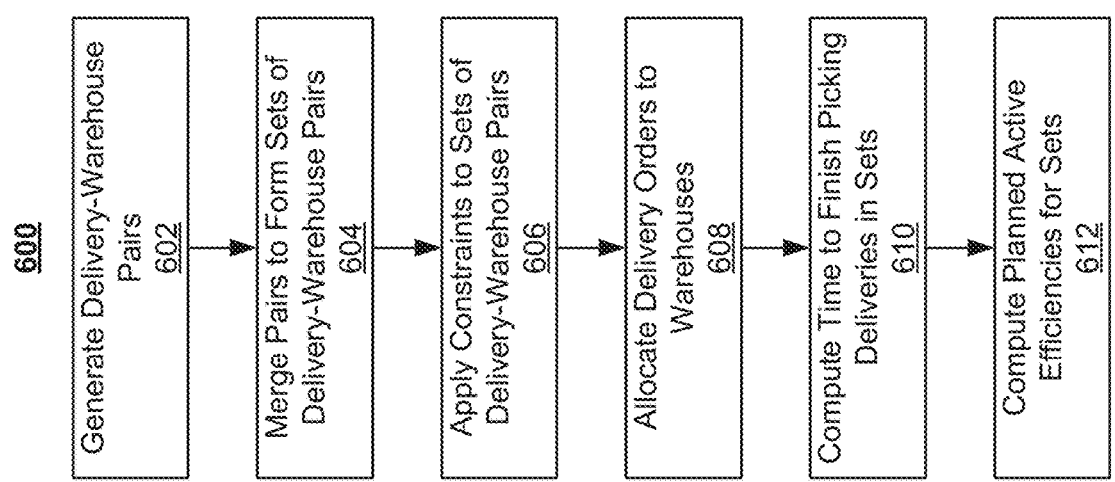
FIG. 6 is a flowchart illustrating a process of allocating delivery orders to warehouses, according to one embodiment.

FIG. 6 is a flowchart illustrating a process 600 of allocating delivery orders to warehouses, according to one embodiment. Process 600 shows one exemplary process for clustering 406 deliveries to retailers, as described with respect to FIG. 4.

The shopper management engine 210 generates warehouse-delivery pairs. Each warehouse-delivery pair associates an order with a plausible warehouse for fulfilling that order. The plausible warehouses for an order can be determined based on the location of the warehouse relative to the order's delivery address and the inventory or stock of the warehouse. In some embodiments, the customer 104 may select a preferred warehouse or a preferred retailer chain. If multiple plausible warehouses are determined, the shopper management engine 210 may determine a subset of the plausible warehouses for forming the delivery-warehouse pairs. For example, the shopper management engine 210 may select a subset of plausible warehouses based on, e.g., the location of the warehouse relative to the delivery address, a likelihood of the items being in stock at the time of pickup (e.g., based on current inventory of the warehouse, inventory trends of the warehouse, etc.), pricing at the warehouse, warehouse preference, or other factors. In some embodiments, if an order cannot be fulfilled at a single warehouse, the order may be divided into order portions, each of which is associated with a different warehouse.

After generating the pairs, the shopper management engine 210 merges the pairs 604 to form sets of delivery-warehouse pairs. The shopper management engine 210 can control the number of combinations by only combining a delivery-warehouse pair with another sufficiently close delivery-warehouse pair (e.g., combine a delivery-warehouse pair with one of the n closest deliveries from the same warehouse). In one embodiment, the shopper management engine 210 pairs one delivery with one warehouse, identifies a second delivery based on the proximity between the second delivery order's delivery location and the first order's delivery location, and then pairs the second delivery order with the first delivery order. After forming the merged sets, the shopper management engine 210 applies constraints 606 to the merged sets of delivery-warehouse pairs to remove any invalid routes. For example, according to one constraint, the shopper management engine 210 may remove routes that include delivery orders with delivery windows that are too far away from each other (e.g., a group that includes one order due at 1-2 pm followed by an order due at 4-5 pm could be considered invalid, because the first order would be delivered late, or the second order delivered early). According to another constraint, the shopper management engine 210 may keep only one permutation for a given combination of orders. For example, a combination of three delivery orders D1, D2, and D3 has six permutations: [D1, D2, D3], [D1, D3, D2], [D2, D1, D3], [D2, D3, D1], [D3, D2, D1], and [D3, D1, D2]. The permutations may be evaluated based on one or more factors, e.g., shortest total travel time, shortest total distance, certainty to delivery orders within their delivery windows, etc. Under this constraint, the shopper management engine 210 evaluates the one or more factors to select the best permutation, and removes the other permutations from the valid routes. After determining the valid routes, the shopper management engine 210 allocates 608 delivery orders to their respective warehouses.

Once the orders have been allocated, the shopper management engine 210 computes 610 the time to finish picking the deliveries in the sets of delivery-warehouse pairs. This is the time by which all orders in a given set of deliveries needs to be picked so that all of the deliveries in the set can be delivered on time. The shopper management engine 210 may include buffer times to account for uncertainty in the pickup of the delivery set and along the delivery route. The shopper management engine 210 then computes 612 the planned active efficiency for each set of deliveries. The active efficiency is the number of total deliveries in the set divided by the total time to pick and delivery all deliveries in the set.

Allocating Shoppers to Orders at a Warehouse

Figure 7:
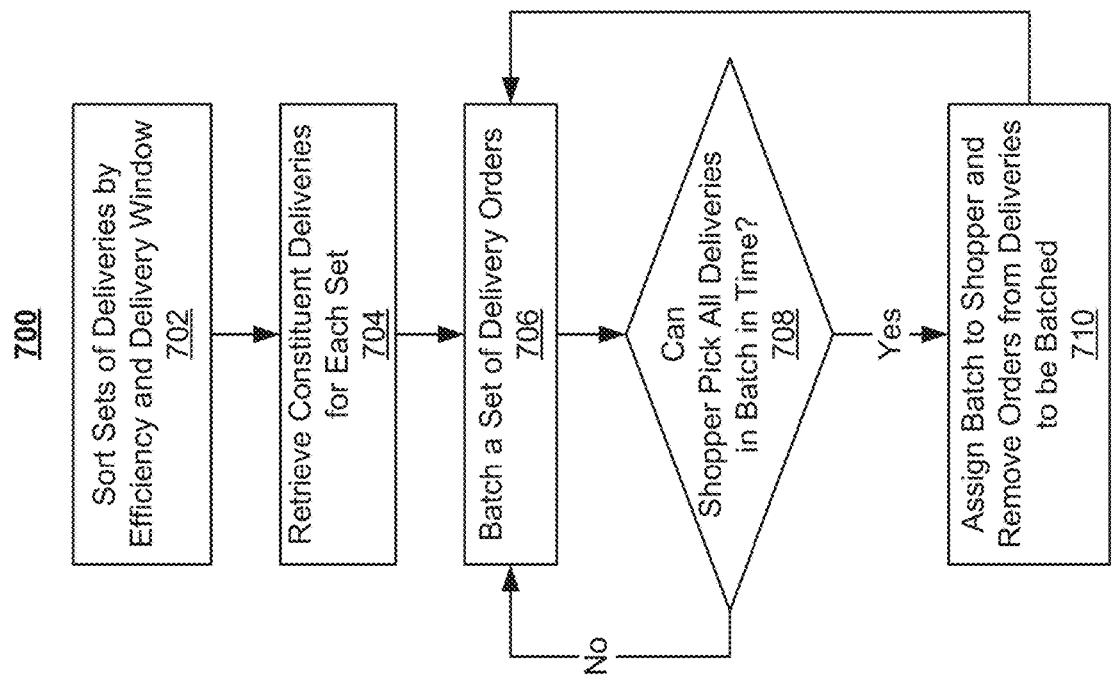
FIG. 7 is a flowchart illustrating a process of allocating delivery orders to in-store shoppers in a particular warehouse, according to one embodiment.

FIG. 7 is a flowchart illustrating a process 700 of allocating delivery orders to in-store shoppers in a particular warehouse, according to one embodiment. Process 700 shows one exemplary process for grouping picking batches 414 in the handoff mode, as described with respect to FIG. 4. Process 700 is executed after the deliveries have been clustered to warehouses, for example, as described with respect to process 600 of FIG. 6.

The shopper management engine 210 sorts 702 the sets of deliveries determined in process 600 by their efficiencies and the delivery windows of the sets. If some sets of deliveries have already been picked, these sets are filtered out. The shopper management engine 210 also retrieves 704 the constituent delivery orders that make up each of the sets determined in process 600. Thus, the shopper management engine 210 identifies the portion of the delivery orders allocated to the warehouse and that need to be assigned to in-store agents.

The shopper management engine 210 batches 706 the identified constituent orders into new sets of delivery orders (which may be different from the sets of delivery-warehouse pairs determined in process 600). If the warehouse allows in-store shoppers to pick two or more orders concurrently, the shopper management engine 210 can batch orders for picking in parallel. After batching the orders, the shopper management engine 210 determines 708 whether a shopper can pick all of the deliveries in the batch in time for their delivery window. In particular, the shopper management engine 210 may determine that each delivery order in the batch can be prepared before the latest time of completion for preparing each delivery order. If the orders in the batch can be prepared in time, the shopper management engine 210 assigns 710 the batch to an in-store shopper located at the warehouse, and removes the delivery orders in the batch from the set of delivery orders remaining to be batched. If not, the shopper management engine 210 attempts another batch.

If the shopper management engine 210 determines that one or more orders cannot be batched, the orders can be shifted to the full service model, described with respect to FIG. 4. For example, if the shopper management engine 210 determines that all in-store shoppers have been assigned a batch, but a delivery order was not allocated to one of the in-store shoppers, the shopper management engine 210 will assign this delivery order to a full service shopper, who will prepare and deliver the order. In some embodiments, the shopper management engine 210 may consider alternatively sending an additional in-store shopper to the warehouse to pick orders that could not be assigned to in-store shoppers.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method or optimizing delivery assignments, the method comprising:
receiving, by an online system from customer devices, a plurality of delivery orders associated with a location, wherein the plurality of delivery orders are prepared at the location for delivery;
responsive to receiving the plurality of delivery orders, identifying, by the online system, a plurality of delivery agents associated with the location;
allocating, by the online system, the plurality of delivery orders among the plurality of delivery agents, each delivery agent being allocated at least one delivery order, each delivery agent being associated with a shopper device having a shopper mobile application installed thereon, the shopper mobile application including:
  a scanning module configured to identify an item of the at least one delivery order and obtain information describing the identified item from the online system,
  a basket manager configured to update a running record of items of the at least one delivery order based on the identified item, and generate order preparation progress data describing progress of preparing the at least one delivery order based on the running record of items of the at least one delivery order, and
  an interface configured to transmit the preparation progress data to the online system;
obtaining, by the online system from the shopper devices, delivery agent progress data describing travel progress of the delivery agents to the location and order preparation progress data describing progress of preparing the plurality of delivery orders for delivery;
periodically updating, by the online system, the allocation of the plurality of delivery orders among the plurality of delivery agents based on the delivery agent progress data and the order preparation progress data by re-allocating at least one delivery order of the plurality of delivery orders to a different delivery agent of the plurality of delivery agents;
in response to a first delivery agent arriving at the location, assigning, by the online system, to the first delivery agent the delivery orders allocated to the first delivery agent; and
in response to assigning to the first delivery agent the delivery orders allocated to the first delivery agent:
  removing, by the online system, the first delivery agent from the plurality of delivery agents; and
  removing, by the online system, the delivery orders assigned to the first delivery agent from the plurality of delivery orders.

2. The method of claim 1, wherein allocating the plurality of delivery orders among the plurality of delivery agents is based on a destination location of each delivery order and a delivery window of each delivery order.

3. The method of claim 2, wherein allocating the plurality of delivery orders among the plurality of delivery agents comprises determining an optimal set of delivery orders for each delivery agent to deliver based on the delivery agent progress data, the order preparation progress data, the destination locations of the plurality of delivery orders, and the delivery windows of the plurality of delivery orders.

4. The method of claim 1, wherein each delivery order of the plurality of delivery orders is prepared for delivery by a picking agent of a plurality of picking agents, and the order preparation progress data describes progress of picking agents in preparing the plurality, of delivery orders for delivery.

5. The method of claim 1, wherein:
the delivery agent progress data comprises an estimated time of arrival for each delivery, agent of the plurality of delivery agents; and
the order preparation progress data comprises an estimated time of preparation completion of each delivery order of the plurality of delivery orders.

6. The method of claim 5, wherein, at a time that the first delivery agent arrives at the location, the delivery orders allocated to the first delivery agent each have an estimated time of preparation completion of zero.

7. The method of claim 1, further comprising:
determining to instruct an additional delivery agent to travel to the location based on a time and a cost associated with the additional delivery agent traveling to the location;
adding the additional delivery agent to the plurality of delivery agents; and
allocating at least one delivery order of the plurality of delivery orders to the additional delivery agent.

8. The method of claim 1, further comprising:
receiving an additional delivery order;
adding the additional delivery order to the plurality of delivery orders; and
allocating the additional delivery order to a second delivery agent of the plurality of delivery agents.

9. The method of claim 8, further comprising:
in response to allocating the additional delivery order to a second delivery agent of the plurality of delivery agents, re-allocating at least one delivery order of the plurality of delivery orders to a different delivery agent of the plurality of delivery agents.

10. The method of claim 1, further comprising:
communicating an instruction to the first delivery agent to travel to the location; and
in response to the first delivery agent arriving at the location, communicating an instruction to the first delivery agent to deliver the delivery orders allocated to the first delivery agent.

11. A non-transitory computer-readable storage medium storing instructions for optimizing delivery assignments, the instructions when executed causing a processor of an online system to:
  receive, from customer devices, a plurality of delivery orders associated with a location, wherein the plurality of delivery orders are prepared at the location for delivery;
  responsive to receiving the plurality of delivery orders, identify a plurality of delivery agents associated with the location;
  allocate the plurality of delivery orders among the plurality of delivery agents, each delivery agent being allocated at least one delivery order, each delivery agent being associated with a shopper device having a shopper mobile application installed thereon, the shopper mobile application including:
    a scanning module configured to identify an item of the at least one delivery order and obtain information describing the identified item from the online system,
    a basket manager configured to update a running record of items of the at least one delivery order based on the identified item, and generate order preparation progress data describing progress of preparing the at least one delivery order based on the running record of items of the at least one delivery order, and
    an interface configured to transmit the preparation progress data to the online system;
  obtain, from the shopper device, delivery agent progress data describing travel progress of the delivery agents to the location and order preparation progress data describing progress of preparing the plurality of delivery orders for delivery;
  periodically update the allocation of the plurality of delivery orders among the plurality of delivery agents based on the delivery agent progress data and the order preparation progress data by re-allocating at least one delivery order of the plurality of delivery orders to a different delivery agent of the plurality of delivery agents;

in response to a first delivery agent arriving at the location, assign to the first delivery agent the delivery orders allocated to the first delivery agent; and in response to assigning to the first delivery agent the delivery orders allocated to the first delivery agent:
remove the first delivery agent from the plurality of delivery agents; and
remove the delivery orders assigned to the first delivery agent from the plurality of delivery orders.

12. The non-transitory computer-readable storage medium of claim 11, wherein allocating the plurality of delivery orders among the plurality of delivery agents is based on a destination location of each delivery order and a delivery window of each delivery order.

13. The non-transitory computer-readable storage medium of claim 12, wherein the instructions when executed cause the processor to allocate the plurality of delivery orders among the plurality of delivery agents further cause the processor to determine an optimal set of delivery orders for each delivery agent to deliver based on the delivery agent progress data, the order preparation progress data, the destination locations of the plurality of delivery orders, and the delivery windows of the plurality of delivery orders.

14. The non-transitory computer-readable storage medium of claim 11, wherein each delivery order of the plurality of delivery orders is prepared for delivery by a picking agent of a plurality of picking agents, and the order preparation progress data describes progress of picking agents in preparing the plurality of delivery orders for delivery.

15. The non-transitory computer-readable storage medium of claim 11, wherein:
the delivery agent progress data comprises an estimated time of arrival for each delivery agent of the plurality of delivery agents; and
the order preparation progress data comprises an estimated time of preparation completion of each delivery order of the plurality of delivery orders.

16. A computer system for optimizing delivery assignments, the computer system comprising:
a computer processor;
a non-transitory computer-readable storage medium storing instructions that when executed by the computer processor perform actions comprising:
receiving, from customer devices, a plurality of delivery orders associated with a location, wherein the plurality of delivery orders are prepared at the location for delivery;
responsive to receiving the plurality of delivery orders, identifying a plurality of delivery agents associated with the location;
allocating the plurality of delivery orders among the plurality of delivery agents, each delivery agent being allocated at least one delivery order, each delivery agent being associated with a shopper device having a shopper mobile application installed thereon, the shopper mobile application including:
a barcode module configured to identify an item of the at least one delivery order and obtain information describing: the identified item from the computer system,
a basket manager configured to update a running record of items of the at least one delivery order based on the identified item, and generate order preparation progress data describing progress of preparing the at least one delivery order based on the running record of items of the at least one delivery order, and
an interface configured to transmit the preparation progress data to the computer system;
obtaining, from the shopper devices, delivery agent progress data describing travel progress of the delivery agents to the location and order preparation progress data describing progress of preparing the plurality of delivery orders for delivery;
periodically updating the allocation of the plurality of delivery orders among the plurality of delivery agents based on the delivery agent progress data and the order preparation progress data by re-allocating at least one delivery order of the plurality of delivery orders to a different delivery agent of the plurality of delivery agents;
in response to a first delivery agent arriving at the location, assigning to the first delivery agent the delivery orders allocated to the first delivery agent; and
in response to assigning to the first delivery agent the delivery orders allocated to the first delivery agent:
removing the first delivery agent from the plurality of delivery agents; and
removing the delivery orders assigned to the first delivery agent from the plurality of delivery orders.

17. The computer system of claim 16, wherein the action of allocating the plurality of delivery orders among the plurality of delivery agents is based on a destination location of each delivery order and a delivery window of each delivery order.

18. The computer system of claim 17, wherein the action of allocating the plurality of delivery orders among the plurality of delivery agents comprises determining an optimal set of delivery orders for each delivery agent to deliver based on the delivery agent progress data, the order preparation progress data, the destination locations of the plurality of delivery orders, and the delivery windows of the plurality of delivery orders.

19. The computer system of claim 16, wherein each delivery orders of the plurality of delivery orders is prepared for delivery by a picking agent of a plurality of picking agents, and the order preparation progress data describes progress of picking agents in preparing the plurality of delivery orders for delivery.

20. The computer system of claim 16, wherein:
the delivery agent progress data comprises an estimated time of arrival for each delivery agent of the plurality of delivery agents; and
the order preparation progress data comprises an estimated time of preparation completion of each delivery order of the plurality of delivery orders.

* * * * *